Nov. 6, 1928.
L. BLOCH
1,690,767
COMBINED MIXING AND DELIVERY VALVE FOR BATH FIXTURES
Filed Feb. 6, 1926      3 Sheets-Sheet 1
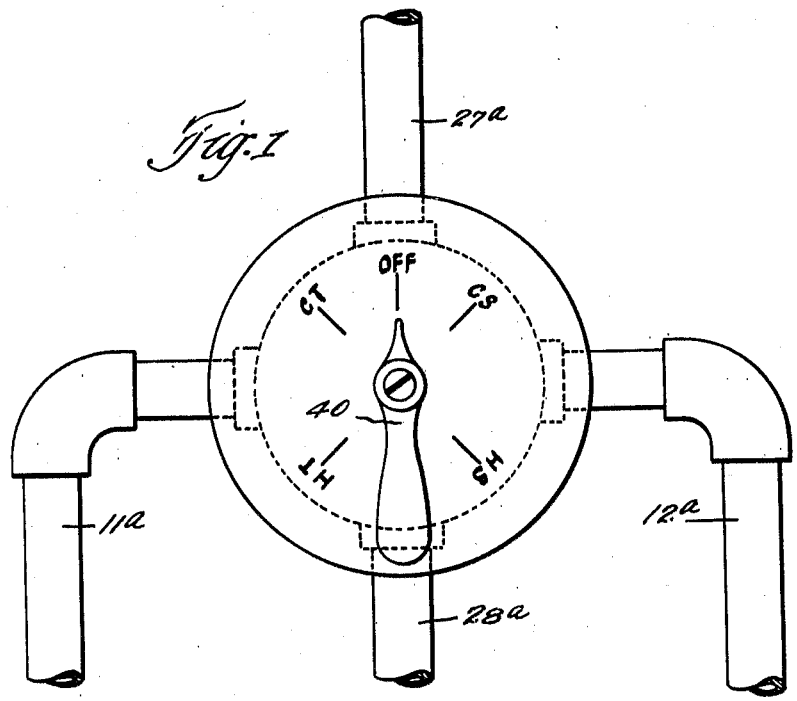
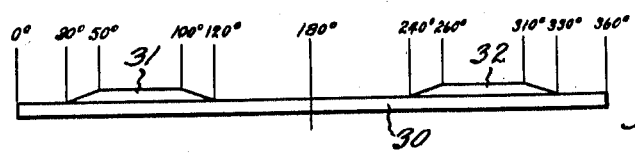
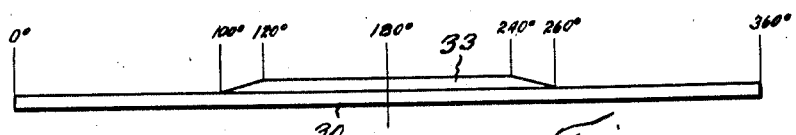
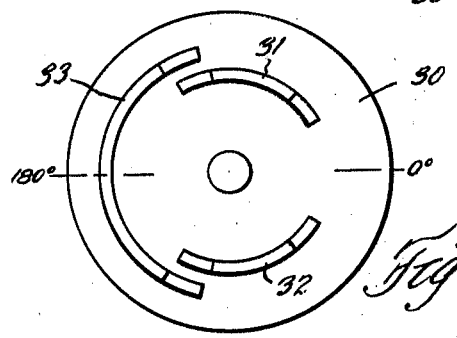
INVENTOR
Leon Bloch
By Hull Brock & West
Attys.

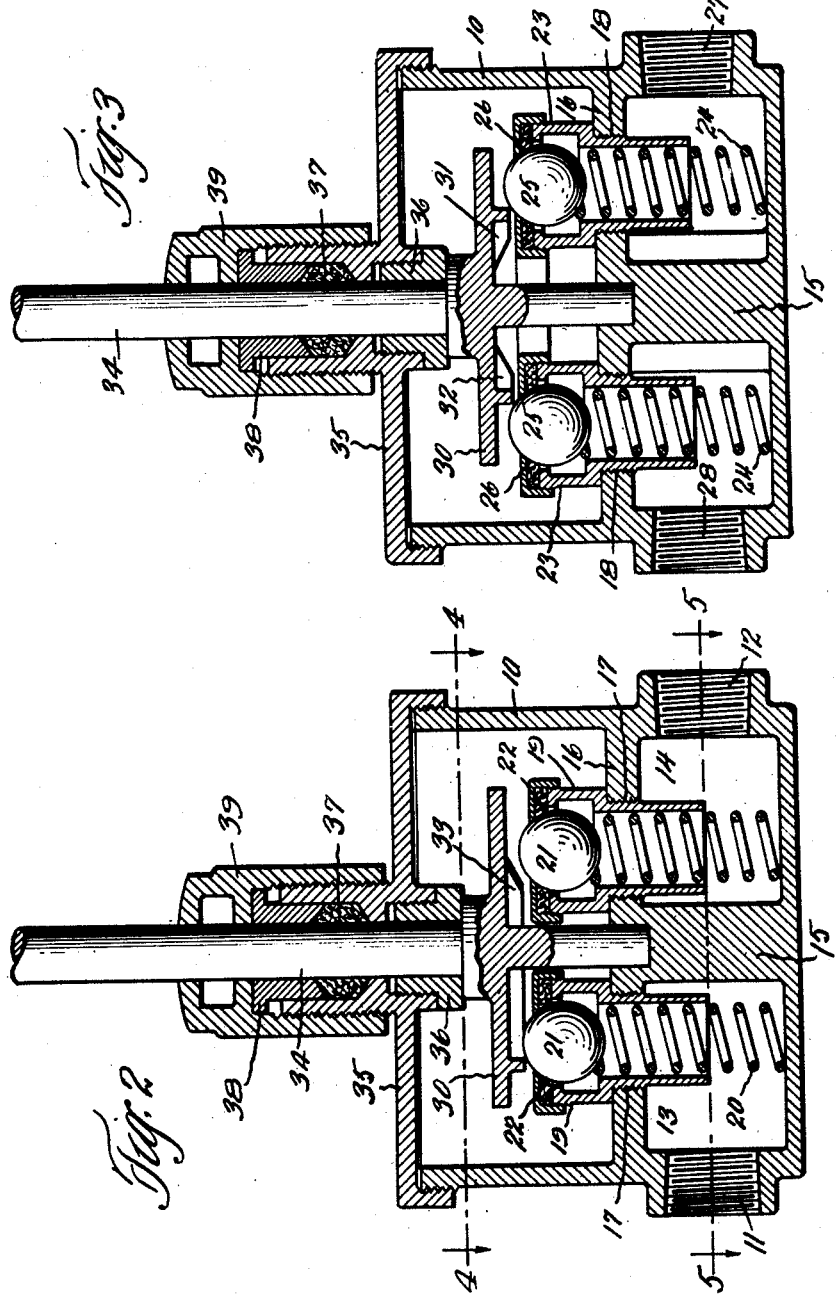

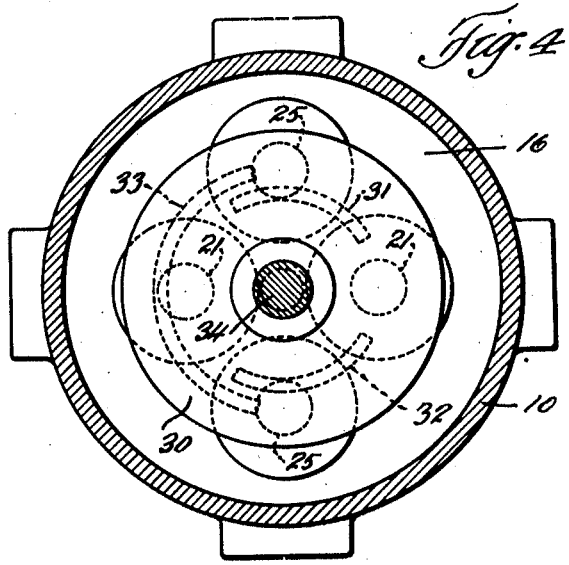
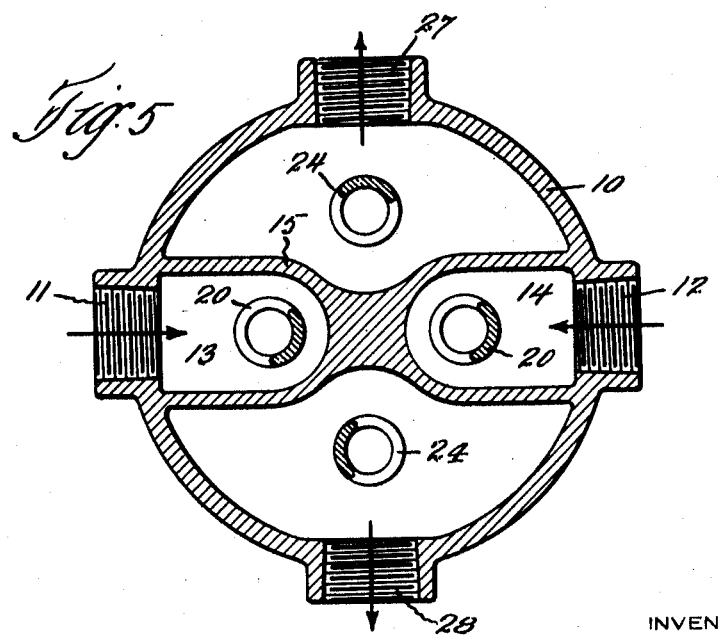

Patented Nov. 6, 1928.

1,690,767

UNITED STATES PATENT OFFICE.

LEON BLOCH, OF CLEVELAND, OHIO, ASSIGNOR TO THE REPUBLIC BRASS COMPANY, OF CLEVELAND, OHIO, A CORPORATION OF OHIO.

COMBINED MIXING AND DELIVERY VALVE FOR BATH FIXTURES.

Application filed February 6, 1926. Serial No. 86,438.

This invention relates generally to bathtub fixtures and is in the nature of a combined mixing and directing valve, that is to say one in which the proper mixture of hot and cold water can be obtained and at the same time directed toward the shower or tub as desired.

The object of the invention is to provide a simple and efficient device whereby these mixing and directing operations can be accomplished. With this object in view the invention consists in the various details of construction and in the novel manner of combining or arranging the same all of which will be fully described hereinafter and set forth in the appended claims.

In the drawings forming a part of this specification Fig. 1 is a front elevation of the apparatus showing the hot and cold water supply pipes connected thereto and the shower and tub delivery pipes leading therefrom and also the indicating pointer and dial used in connection therewith; Fig. 2 is a horizontal longitudinal section taken through the casing, the actuating stem and the ball valves being shown in elevation; Fig. 3 is a vertical longitudinal section similar to Fig. 2 but taken at right angles thereto; Fig. 4 is a transverse vertical section on the line 4—4 of Fig. 2 and Fig. 5 is a transverse vertical section on the line 5—5 of Fig. 2; Fig. 6 is a diagram of the cam for actuating the tub and shower outlet valves; Fig. 7 is a diagrammatic view of the cams for actuating the hot and cold inlet valves and Fig. 8 is a face view of the cam.

In the practical embodiment of my invention I preferably provide a hollow casing 10 substantially cylindrical in shape and having an inlet opening 11 with which the pipe 11$^a$ communicates and at the opposite side is an opening 12 with which the pipe 12$^a$ communicates and the water from these pipes 11$^a$ and 12$^a$ enters chambers 13 and 14 respectively, these chambers being formed by the walls 15 integral with the casing and there is also formed in the casing a partition 16 subdividing the casing into two sections.

This partition 16 has four openings 17 and 18 produced therein, two of said openings 17 communicating with the chambers 13 and 14 and in these openings 17 there are arranged the externally shouldered and threaded sleeves or thimbles 19, these sleeves or thimbles being threaded into the partition 16 and extending upon both sides of said central partition and within the inner portion of each sleeve or thimble is arranged a coil spring 20 which bears at its inner end against the inner wall of the casing and at its outer end against the ball valve 21, these ball valves being arranged in the outer ends of the sleeves or thimbles and seating upon properly constructed valve seats 22 arranged in connection with the outer ends of the sleeves or thimbles.

In the openings 18 there are arranged similarly constructed sleeves or thimbles 23 having springs 24 therein and ball valves 25 which have seats 26 connected to the outer ends of the sleeves or thimbles as previously described.

When the ball valves 21 are opened the water from the inner portion of the chamber passes through to the outer portion thereof, the water entering through the openings 11 and 12 and coming from the pipes 11$^a$ and 12$^a$. When the ball valves 25 are opened the water from the outer portion of the chamber passes through to the inner portion of said chamber and out through the openings 27 and 28 to the shower pipe 27$^a$ and the tub pipe 28$^a$. For the purpose of actuating these valves I employ a disk 30 having cams 31 and 32 upon the inner face thereof for actuating the valves 21 and also a cam 33 for actuating the valves 25.

It will be noted by reference to Figs. 6, 7 and 8, that the cam 33 is arranged farther from the center of the disk than the cams 31 and 32 and in this connection it will be noted that the openings 18 are spaced further from the center of the casing than the openings 17, said openings 17 as previously described communicating with the hot and cold water pipes while the openings 18 communicate with the shower and tub pipes. In other words, the openings 17 communicate with the supply pipes and the openings 18 communicate with the discharge pipes.

The mixing of the hot and cold water takes place within the casing and the proper temperature of the mixture is controlled by the opening of the valves in proper order and the direction of the mixed water to the shower or tub is controlled by the proper movement of the actuating cam which operates the valves 25. The cams 31 and 32 are each 90° in extent and by reference to Figs. 6 and 8 it will be noted that each cam begins 30° from the zero point and rises for a distance of 20°, is then flat for 50° and then descends for 20° more. The cam 33 begins at 100° from zero, rises through 20°, is flat for 120° and then descends for 20°. It will also be noted by reference to Fig. 8 that the 20° of inclination at the ends of the cams 31 and 32 is in radial alignment with the inclinations at the ends of the cam 33.

The disk 30 is carried by a stem 34 the inner end of which fits in a suitable central recess produced in the wall 15 midway between the chambers 13 and 14. The casing is provided with a cover 35 preferably screwed upon the outer end of the casing as shown and the stem 34 passes centrally through this cover.

Surrounding the stem and upon the interior of the cover there is preferably arranged a bushing 36 and upon the exterior of the cover and surrounding the stem there is preferably arranged the packing 37 held in place by the gasket 38 which in turn is surrounded by a suitable cap nut 39 arranged upon the stem and screwing upon the central threaded extension of the cover.

The outer face of the cover may have the indicating marks placed thereon or a separate dial may be employed if so desired but whether the marks are placed upon the casing or a separate dial employed, these marks are used in connection with a pointer 40 arranged upon the end of the shaft 34. The indicating marks are of course arranged with reference to the pointer in its normal position such as shown in Fig. 1 wherein the pointer is shown in a vertical position and its upper end adjacent to the mark designated "Off". When the pointer is in this position all of the valves will be closed.

If it should be desired to direct cold water to the tub the pointer is moved to the position indicated by CT and this movement of the stem will cause the valve 21 communicating with the chamber 14 to be opened while the valve 21 communicating with the chamber 13 will remain closed and at the same time the valve 25 communicating with the pipe 28ᵃ will be opened thereby directing the cold water to the tub.

If the stem should be still further turned so as to move the pointer towards the mark HT a certain amount of hot water will be admitted and mixed in the chamber and directed to the tub and if the stem should be turned so as to bring the pointer to the position HT the cold water will be cut off and hot water only directed to the tub.

To direct cold water to the shower the stem is turned so as to bring the pointer to the position indicated at CS and if continued still further there will be a commingling of the hot and cold water within the casing which will be directed towards the shower and if the rotation of the stem is continued until the pointer reaches HS, then the cold water will be cut off from the shower and hot water only delivered thereto.

It will thus be seen that by means of a single stem carrying a single disk provided with properly spaced cams I am able to actuate the four ball valves which control the inlet and outlet of the water so that either all cold or all hot can be directed to either the shower or the tub or a proper mixture directed to either the shower or the tub.

It will thus be seen that I provide a very simple contrivance for accomplishing the various objects hereinbefore recited and one which can be economically fabricated and operated with precision and certitude.

Having thus described my invention, what I claim is:

1. In a device of the kind described, a casing having a sub-dividing partition providing a mixing chamber, walls upon the opposite side of said partition providing inlet and delivery compartments, inlet pipes communicating with the inlet compartments, delivery pipes communicating with the delivery compartments, spring pressed valves between the inlet compartments and mixing chamber, spring pressed valves between the mixing chamber and delivery compartments, and a cam disk for actuating said valves as set forth.

2. In a device of the kind described, a casing having hot and cold inlet compartments and tub and shower delivery compartments and a mixing chamber communicating with the inlet and delivery compartments, there being a partition separating said mixing chamber from said compartments, sleeves arranged in said partition, valves arranged in said sleeves and provided with seats, said casing having a cover, a stem working through said cover and a cam disk carried by the stem and arranged within the casing and adapted to operate upon said valves as specified.

3. In a device of the kind described, a casing having a mixing chamber and inlet compartments and delivery compartments, there being a partition between said mixing chamber and said compartments, sleeves arranged in said partition, spring pressed ball valves arranged in said sleeves and provided with seats, a cover for said casing, a stem passing through said cover, a disk connected to said stem and arranged within the casing, and cams upon the inner face of said disk and operating upon said valves to open the same.

4. In a device of the kind described a casing having inlet compartments, delivery compartments and a mixing chamber, there being a partition between the compartments and chamber, said partition being apertured, sleeves arranged in said apertures, the centers of the sleeves of the inlet compartments being closer to the center of the casing than the centers of the sleeves of the delivery compartments, spring pressed ball valves arranged in said sleeves and cooperating with seats carried by said sleeves, a cover for said casing, a stem working through said cover, a disk upon said stem and within the casing, said disk being provided with concentric and radially spaced cams for actuating said valves.

5. A combined mixing and directing valve of the character described comprising a casing having a plurality of inlets, a partition within said casing defining a mixing chamber, a plurality of outlets leading from said mixing chamber, valves controlling said inlets and valves controlling said outlets, a cover for said casing, a stem passing through said cover, a single disk carried by said stem and having a plurality of cam surfaces on one face thereof for operating said valves, said cam surfaces being so positioned and arranged as to open said valves in predetermined sequence.

6. A combined mixing and directing valve of the character set forth comprising a casing having a hot water inlet and a cold water inlet, a partition within said chamber defining a mixing chamber into which said inlets deliver, a pair of outlets leading from said mixing chamber, a valve for each of said inlets and a valve for each of said outlets, a cover for said casing, a stem extending through said cover, a single disk carried by said stem and having a plurality of concentric and radially spaced cam surfaces thereon for opening said valves in a predetermined sequence.

7. A combined mixing and directing valve of the character described comprising a casing having hot and cold water inlet chambers and a mixing chamber, hot and cold water inlet pipes connected with said hot and cold water inlet chambers, respectively, a pair of outlet pipes connected with said mixing chamber and leading one to a tub and one to a shower, said hot and cold water inlet chambers each having a valve for connecting the same with the mixing chamber, said mixing chamber having valves for connecting the same with the shower or tub, and a valve actuating disk having a plurality of concentric and radially disposed cams on one face thereof for actuating said valves in a predetermined order.

8. A combined mixing and directing valve of the character described comprising a casing having hot and cold water inlet chambers and a mixing chamber, hot and cold water inlet pipes connected with said hot and cold water inlet chambers respectively, a pair of outlet pipes connected with said mixing chamber and leading one to a tub and one to a shower, said hot and cold water inlet chambers each having a valve for connecting the same with the mixing chamber, said mixing chamber having valves for connecting the same with the shower or tub, and a single valve actuating member for actuating independently or in unison the valves between the hot and cold water inlet chambers and the mixing chamber.

In testimony whereof, I hereunto affix my signature.

LEON BLOCH.